(12) United States Patent
Baker et al.

(10) Patent No.: US 11,017,795 B2
(45) Date of Patent: May 25, 2021

(54) IDENTIFYING AND ADDRESSING NOISE IN AN AUDIO SIGNAL

(71) Applicant: iZotope, Inc., Cambridge, MA (US)

(72) Inventors: Todd Baker, Hampstead, NH (US); Alexey Lukin, Somerville, MA (US); Jonathan Bailey, Brooklyn, NY (US); Matthew Campbell, Arlington, MA (US)

(73) Assignee: iZotope, Inc., Cambridge, MA (US)

( * ) Notice: Subject to any disclaimer, the term of this patent is extended or adjusted under 35 U.S.C. 154(b) by 0 days.

(21) Appl. No.: 16/809,313

(22) Filed: Mar. 4, 2020

(65) Prior Publication Data
US 2020/0202882 A1 Jun. 25, 2020

Related U.S. Application Data

(63) Continuation of application No. PCT/US2018/054610, filed on Oct. 5, 2018.
(Continued)

(51) Int. Cl.
*G10L 21/0232* (2013.01)
*G10L 25/51* (2013.01)
(Continued)

(52) U.S. Cl.
CPC ......... *G10L 21/0232* (2013.01); *G10L 25/51* (2013.01); *G10L 2021/02085* (2013.01); *H04B 15/00* (2013.01); *H04W 84/12* (2013.01)

(58) Field of Classification Search
CPC ............... G10L 21/0232; G10L 25/51; G10L 2021/02085; H04W 84/12; H04R 3/005;
(Continued)

(56) References Cited

U.S. PATENT DOCUMENTS

| 8,223,990 B1 * | 7/2012 | King | H04B 15/00 |
| | | | 381/94.3 |
| 10,083,707 B1 | 9/2018 | Ou | |

(Continued)

FOREIGN PATENT DOCUMENTS

WO    WO 2009/140792    11/2009

OTHER PUBLICATIONS

International Search Report and Written Opinion dated Jan. 29, 2019 in connection with International Application No. PCT/US2018/054610.
(Continued)

*Primary Examiner* — Xu Mei
(74) *Attorney, Agent, or Firm* — Wolf, Greenfield & Sacks, P.C.

(57) ABSTRACT

Some embodiments of the invention are directed to techniques for suppressing or attenuating noise in audio circuitry, such as which may result from a source of electromagnetic energy being coupled to the audio circuitry. Some embodiments may employ two separate channels, a first of which captures audio information and noise, and a second of which captures the noise. Noise compensation may be performed by transforming the signal of the first channel in accordance with noise in the second channel which is identified as comprising a particular type of noise.

20 Claims, 13 Drawing Sheets

Related U.S. Application Data

(60) Provisional application No. 62/568,643, filed on Oct. 5, 2017.

(51) Int. Cl.
    *G10L 21/0208*    (2013.01)
    *H04W 84/12*      (2009.01)
    *H04B 15/00*      (2006.01)

(58) Field of Classification Search
    CPC . H04R 2410/01; H04R 2410/05; H04B 15/00
    USPC .................................. 381/56, 57, 94.6, 94.7
    See application file for complete search history.

(56) References Cited

U.S. PATENT DOCUMENTS

| | | | |
|---|---|---|---|
| 2003/0231775 A1* | 12/2003 | Wark | G10L 15/04 381/56 |
| 2014/0079244 A1* | 3/2014 | Vrazic | H04L 25/0307 381/94.1 |
| 2015/0098578 A1* | 4/2015 | Dadu | H04B 7/015 381/66 |
| 2016/0284362 A1 | 9/2016 | Oda | |
| 2017/0194015 A1* | 7/2017 | Buchner | G10L 21/028 |

OTHER PUBLICATIONS

International Preliminary Report on Patentability dated Apr. 16, 2020 in connection with International Application No. PCT/US2018/054610.

\* cited by examiner

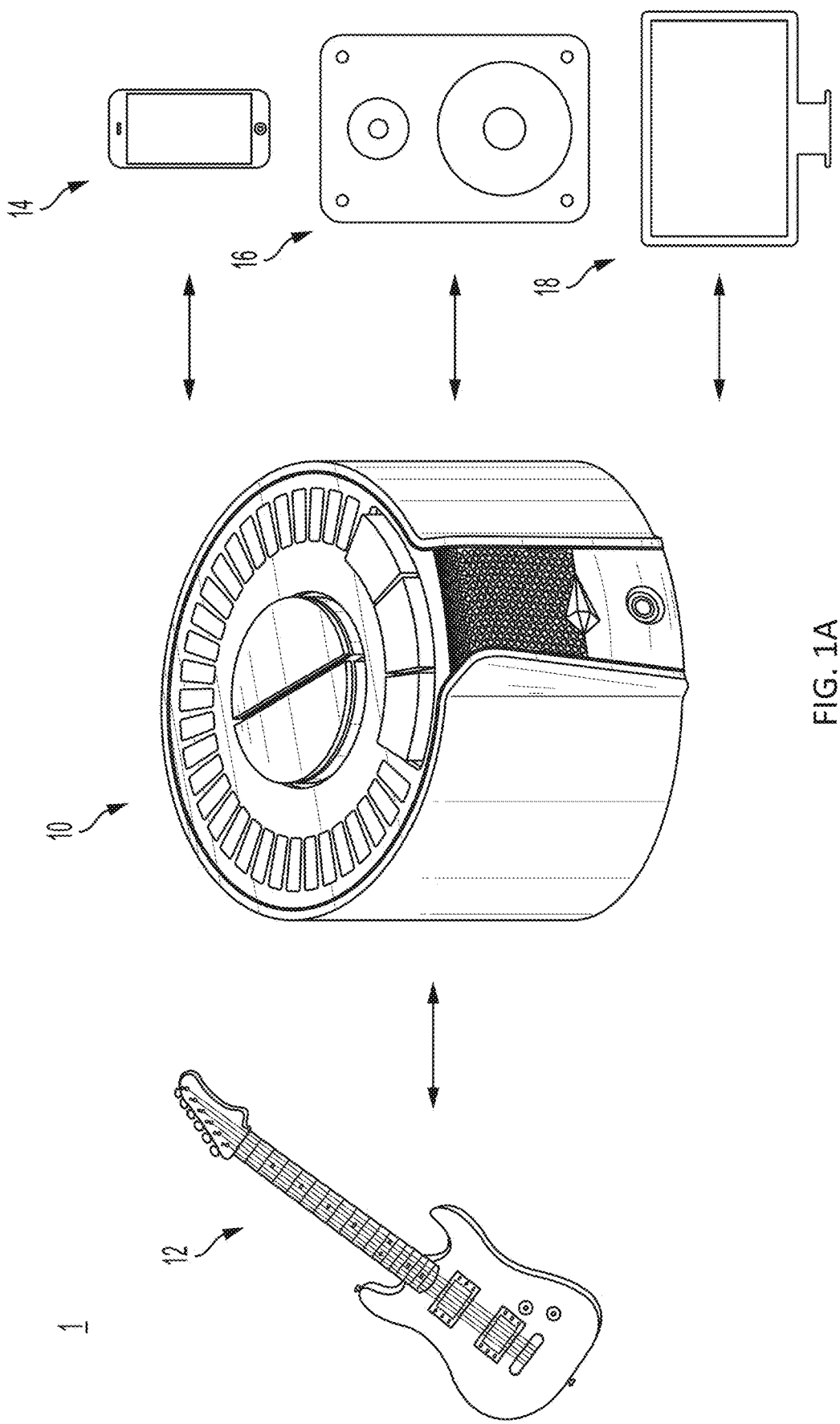

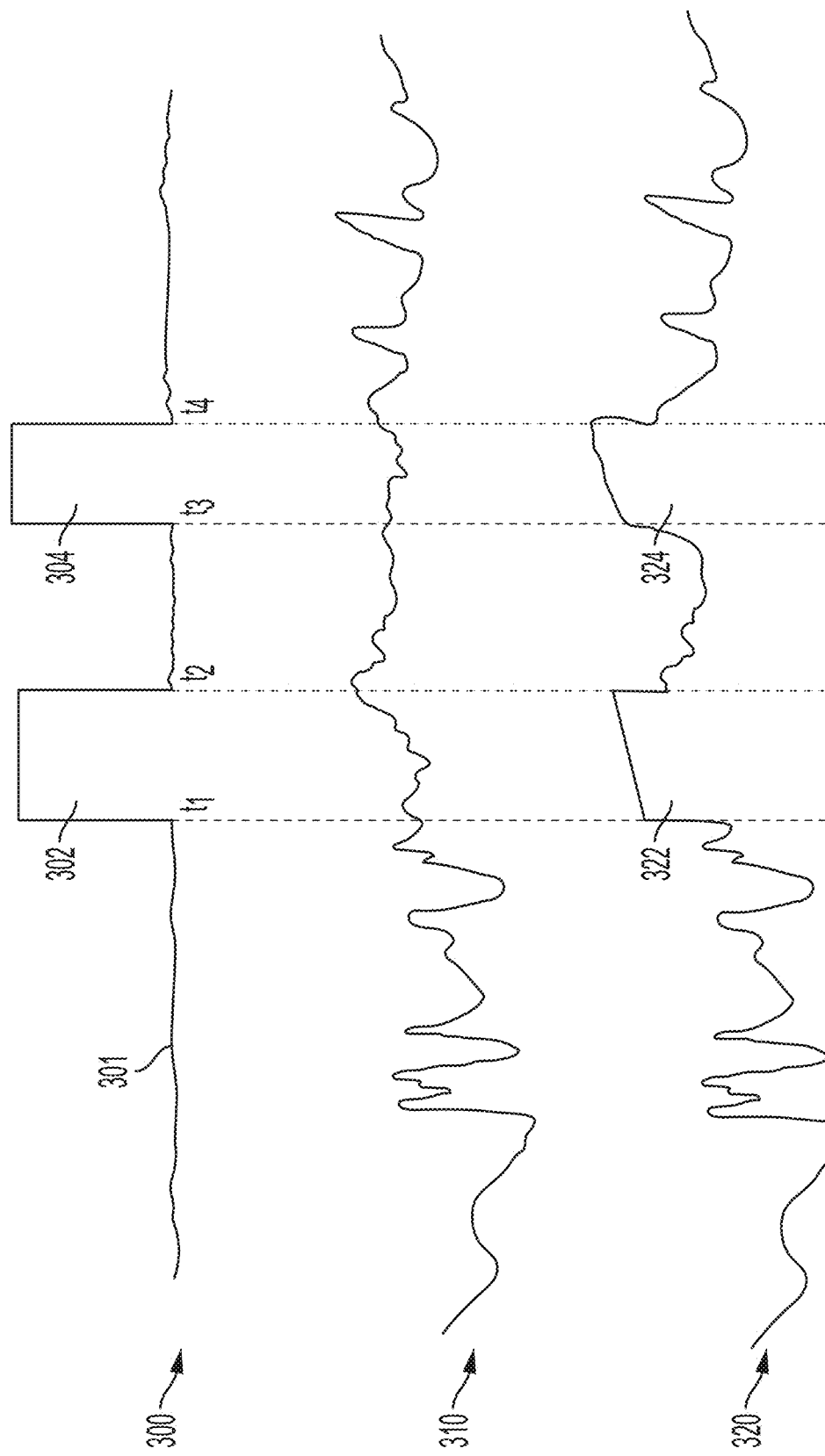

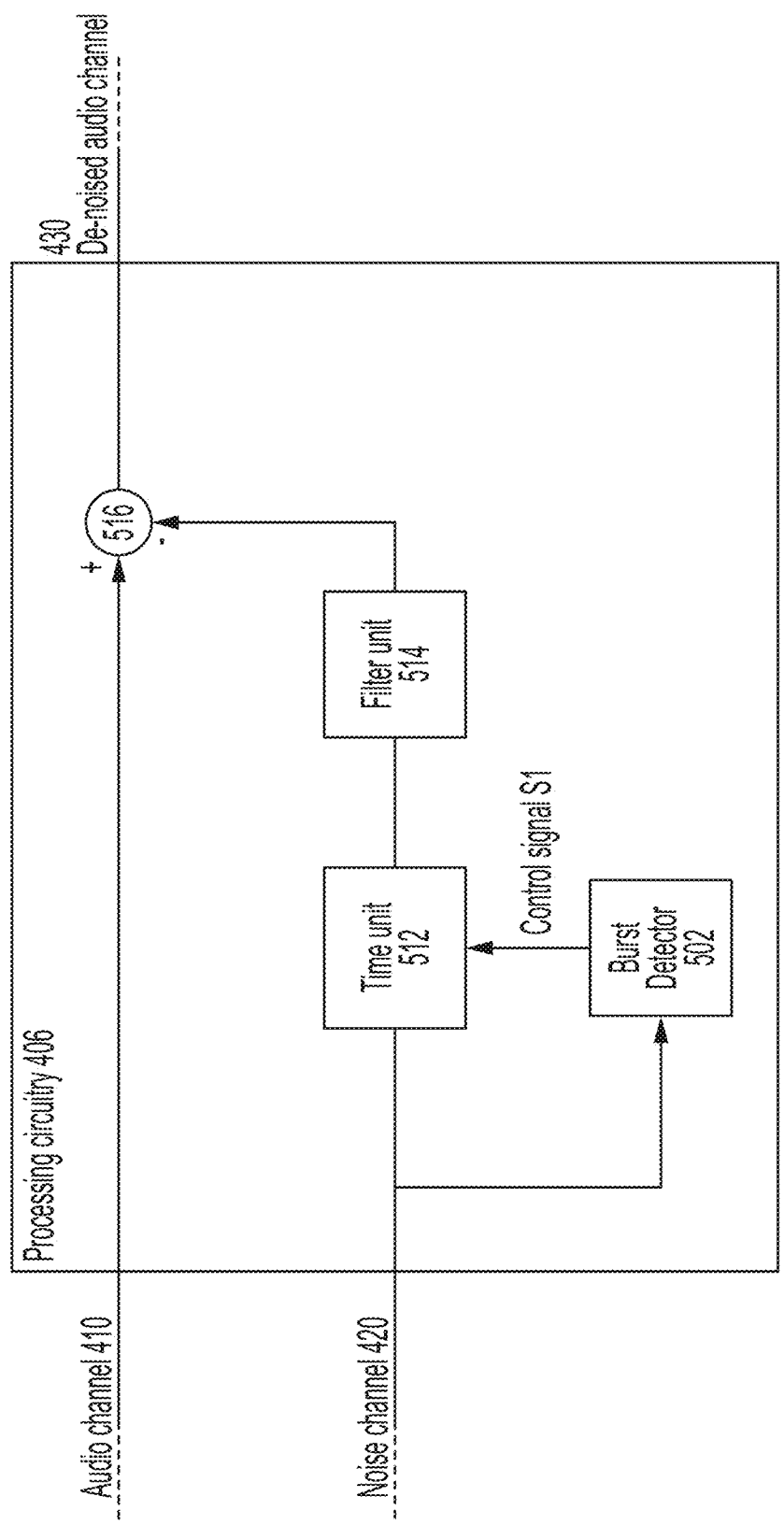

IDENTIFYING AND ADDRESSING NOISE IN AN AUDIO SIGNAL

RELATED APPLICATIONS

This application is a continuation of International Patent Application No. PCT/US2018/054610, filed Oct. 5, 2018, entitled "Identifying And Addressing Noise In An Audio Signal," which claims priority to U.S. Provisional Patent Application Ser. No. 62/568,643, filed Oct. 5, 2017, entitled "Suppressing Noise In Audio Circuitry". Each document listed above is incorporated herein by reference in its entirety.

BACKGROUND

Audio production tools exist which enable users to produce high-quality audio. For example, some audio production tools include hardware and/or software, and enable users to record one or more audio sources (e.g., vocals and/or speech captured by a microphone, music played with an instrument, etc.), process the audio (e.g., to master, mix, design, and/or otherwise manipulate the audio), and/or control its playback. Audio production tools may be used to produce audio including but not limited to music, speech, sound effects, and/or other noises.

SUMMARY

Some embodiments of the invention are directed to an audio processing device comprising: a housing; an audio input port attached to the housing; audio circuitry disposed inside the housing and electrically coupled to the audio input port; a source of electromagnetic energy inside the housing; and processing circuitry disposed inside the housing and configured to: receive a first signal comprising audio produced by the audio circuitry and noise; receive a second signal comprising the noise; identify one or more portions of the second signal as comprising a particular type of the noise resulting from the source of electromagnetic energy; and modify the first signal to address the particular type of noise.

Other embodiments are directed to a method for identifying and addressing noise in an audio signal, the method comprising acts of: (A) receiving a first signal comprising audio produced by the audio circuitry and noise; (B) receiving a second signal comprising the noise; (C) identifying one or more portions of the second signal as comprising a particular type of the noise resulting from a source of electromagnetic energy; and (D) modifying the first signal to address the particular type of noise.

Yet other embodiments are directed to a method for use in relation to an audio device, the method comprising acts of: (A) receiving an audio signal produced by the audio device; (B) identifying one or more portions of the audio signal as comprising a type of noise resulting from operation of a wireless transmission component by the audio device; and (C) modifying the one or more portions of the audio signal to address the type of noise.

BRIEF DESCRIPTION OF DRAWINGS

Various aspects and embodiments of the invention are described herein with reference to the following figures. It should be appreciated that the figures are not necessarily drawn to scale. Items appearing in multiple figures are indicated by the same reference number in all the figures in which they appear. In the figures:

FIG. 1A is a schematic diagram of a representative audio production system including an illustrative audio controller, according to some non-limiting embodiments;

FIG. 3 is an illustrative plot of a noise signal, an audio signal, and a noisy audio signal, according to some non-limiting embodiments;

FIG. 5A is a block diagram depicting representative processing circuitry which may be used as the processing circuitry of FIG. 4A, according to some non-limiting embodiments;

DETAILED DESCRIPTION

Figure 1C:
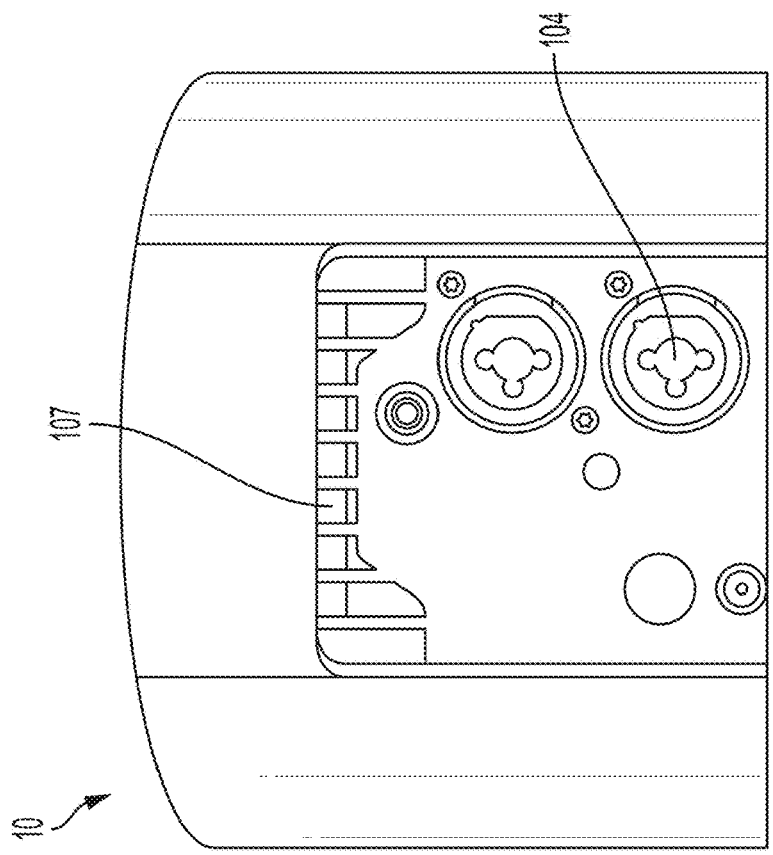
FIG. 1C is a rear view of the illustrative audio controller of FIG. 1A, according to some non-limiting embodiments.

Commonly assigned U.S. patent application Ser. No. 16/034,691, filed Jul. 13, 2018, entitled "Audio Control System And Related Methods," discloses an illustrative audio production controller. One beneficial quality of the illustrative audio production controller disclosed in the '691 application is that its compact form factor enables it to be more portable, and easier to use, than conventional audio production tools. As a result, it may be more convenient and practical to use in certain (e.g., space-constrained) settings.

In some embodiments disclosed in the '691 application, the audio production controller forms part of an overall audio production system, and communicates over one or more networks with other electronic devices, such as smartphones, tablets, loudspeakers, and/or other devices.

The Assignee has appreciated that one challenge associated with an audio production controller with a compact form factor is that its various circuitry (including that which is used to capture and process audio, and that which transmits information to other devices) sits in close proximity within the housing of the audio production controller. The Assignee has also appreciated that placing audio circuitry in close proximity with a source of electromagnetic energy can result in audible, unwanted noise being included in an audio signal generated by the audio circuitry. This unwanted noise in the audio signal may, for example, result from electromagnetic coupling between a source of electromagnetic energy and the audio circuitry. The Assignee has appreciated that various types of circuitry, such as transmission components (e.g., Wi-Fi or cellular antennas), digital clocking circuitry, inter-system digital communication components, LED drive matrixes, and other components may comprise sources of electromagnetic energy which can, when situated in close proximity to audio circuitry, result in unwanted noise being included in an audio signal generated by the audio circuitry.

The Assignee has appreciated, of course, that one approach to reducing this unwanted noise in an audio signal is to place the components which produce electromagnetic energy in locations which are physically remote from the audio circuitry. The Assignee has also recognized, however, that it may not always be possible or practical to do so without sacrificing at least some of the portability and ease of use of the audio production controller discussed above.

Accordingly, some embodiments of the invention are directed to techniques for addressing (e.g., reducing or eliminating) any unwanted noise which is included in an audio signal produced by audio circuitry as a result of the audio circuitry being in close proximity with a source of electromagnetic energy. Various techniques for addressing unwanted noise in an audio signal are disclosed herein. In some embodiments, a technique employs two separate channels, one (referred to be below as a first channel) which carries a first signal comprising desired, high-quality audio information produced by audio circuitry as well as unwanted noise resulting from a source of electromagnetic energy (e.g., resulting from the normal operations of control and communications subsystems in an audio production controller). A second channel carries a second signal comprising noise, including the noise resulting from the source of electromagnetic energy. The second channel may comprise circuitry which is physically separate and discrete from the first channel (i.e., from the audio circuitry), so that it serves as a dedicated "noise channel." In some embodiments, the second channel may be situated so that it is subjected to the same or similar electromagnetic energy as the first channel, so that the noise captured in the second channel duplicates or nearly duplicates the noise present in the first channel. This may be accomplished using any of numerous techniques. In some embodiments, circuitry comprising the second channel may be placed physically proximate (e.g., adjoining) the circuitry comprising the first channel, so that it can be assumed that the circuitry for each channel is exposed to electromagnetic energy having similar characteristics, and the noise captured in the second channel is similar in some respects to the noise present in the first signal. The circuitry comprising the second channel may be similar to the circuitry comprising the first channel in certain respects, and/or may vary in certain respects. For example, the circuitry comprising the second channel may be designed to detect noise which may not be detectable via the circuitry comprising the first channel.

The signal captured in the second channel may then be analyzed to identify one or more specific types of noise which result from a source of electromagnetic energy. In this respect, the Assignee has appreciated that an audio signal may include a variety of types of noise, only some of which may be unwanted, and only some of which may be reduced or eliminated from an audio signal without producing undesirable effects. As such, some embodiments of the invention are directed to techniques for identifying one or more specific types of unwanted noise, and addressing only the identified type(s) in processing an audio signal. Any of numerous techniques may be used to identify the specific type(s) of noise which are to be addressed. In some embodiments, a specific type of noise may be identified based upon characteristics such as its spectral content, dynamic content, power, phase, timing, and/or other characteristics.

Specifically with respect to wireless transmission components, the Assignee has appreciated that the type of noise which results from these components being located in physical proximity with audio circuitry often exhibits certain characteristics. In this respect, the Assignee has recognized that the noise is often produced in intermittent, transient fashion, perhaps because many transceivers (e.g., those adapted for Wi-Fi and Bluetooth communication) are configured to transmit data in bursts. The Assignee has also recognized that during transmission of a burst, a wireless transmission component may produce a significant amount of electromagnetic energy, resulting in strong electromagnetic coupling with audio circuitry. As such, some embodiments of the invention are specifically directed to techniques for identifying the type of noise which results from data being transmitted in bursts. This may be performed in any of numerous ways, such as by examining the signal in the second channel to identify noise which satisfies a predefined gain threshold, exhibits certain waveform characteristics, and/or satisfies any of numerous other criteria. It should be appreciated, of course, that the invention is not limited to using only this technique in identifying the noise resulting from the operation of wireless transmission components, as any suitable technique may be used. It should also be appreciated that the invention is not limited to identifying only noise which is caused by the operation of wireless transmission components, and may be used to identify noise resulting from the operation of any type of component, or any suitable physical phenomenon. It should further be appreciated that the invention is not limited to identifying noise resulting from electromagnetic coupling between a component and audio circuitry. For example, some embodiments of the invention may be used to identify the "static" noise which sometimes results from an instrument or microphone being connected via an audio input jack.

Addressing (e.g., reducing or eliminating) one or more identified types of noise in an audio signal may also be performed in any suitable way(s). For example, addressing an identified type of noise may involve digital signal processing, analog audio signal subtraction, or some combination thereof. If digital signal processing is employed, any suitable transformation(s) may be applied to an audio signal to address the unwanted noise. For example, in some embodiments, the phase of a signal portion comprising an identified type of noise may be flipped 180 degrees and added it to the audio signal. In some embodiments, one or more transfer functions (e.g., filters) may be applied to an audio signal during time periods in which an identified type of noise occurs. Any suitable technique(s) may be used to reduce or eliminate an unwanted noise from an audio signal. Further, the technique(s) may be performed substantially in real-time (as the audio signal is produced), or at some later point in time, as the invention is not limited in this respect.

The Assignee has also appreciated that audio devices which are portable may be subjected to varying environmental conditions over time, and that as a result, the circuitry therein may be subjected to electromagnetic energy which varies over time. For example, placing an audio device on a metal counter, or close to another digital device that produces conducted or radiated emissions, may alter the amount and/or frequency of electromagnetic energy to which circuitry is subjected over time. Accordingly, some embodiments of the invention may provide for varying (e.g., periodically, in response to a change in an audio device's environment, and/or based upon any other suitable criteria being satisfied) the way in which unwanted noise is addressed in an audio signal over time, so as to appropriately address the noise resulting from varying electromagnetic energy.

FIG. 1A depicts a representative audio production system 1 in which some aspects of the invention may be implemented. In representative audio production system 1, audio controller 10 receives input from instrument 12 (an electric guitar in the example shown). Of course, a representative audio controller 10 may receive input from any suitable type and number of musical instruments. For example, representative audio controller 10 may receive input from one or more microphones, computer systems programmed with software for generating electronic music or other digitally created audio, and/or any other suitable device(s) for producing audio input. Representative audio controller 10 produces output to several illustrative electronic devices, including smartphone 14, loudspeaker 16 and monitor 18. Of course, representative audio controller 10 may supply output to any suitable number and type of device(s).

Representative audio controller 10 generates digital representations of (i.e., digitize) audio input received from instrument 12. Representative audio controller 10 may process audio input in any of numerous ways. For example, representative audio controller 10 may filter, equalize, amplify, attenuate, partition into tracks, and/or otherwise process the audio input. In some embodiments, representative audio controller 10 may store digitized audio in memory.

In FIG. 1A, representative audio controller 10 transmits not only digitized audio, but also any of numerous other types of information, to smartphone 14, loudspeaker 16, monitor 18, and/or other suitable devices. Representative audio controller 10 may transmit information using any of numerous communication protocols, including but not limited to wireless (e.g., Wi-Fi, Bluetooth, etc.) communication protocols. The information may, for example, enable a device to reproduce the digitized audio, render a graphical user interface relating to digitized audio, control a function of representative audio controller 10, and/or perform any of numerous other functions.

Figure 1B:
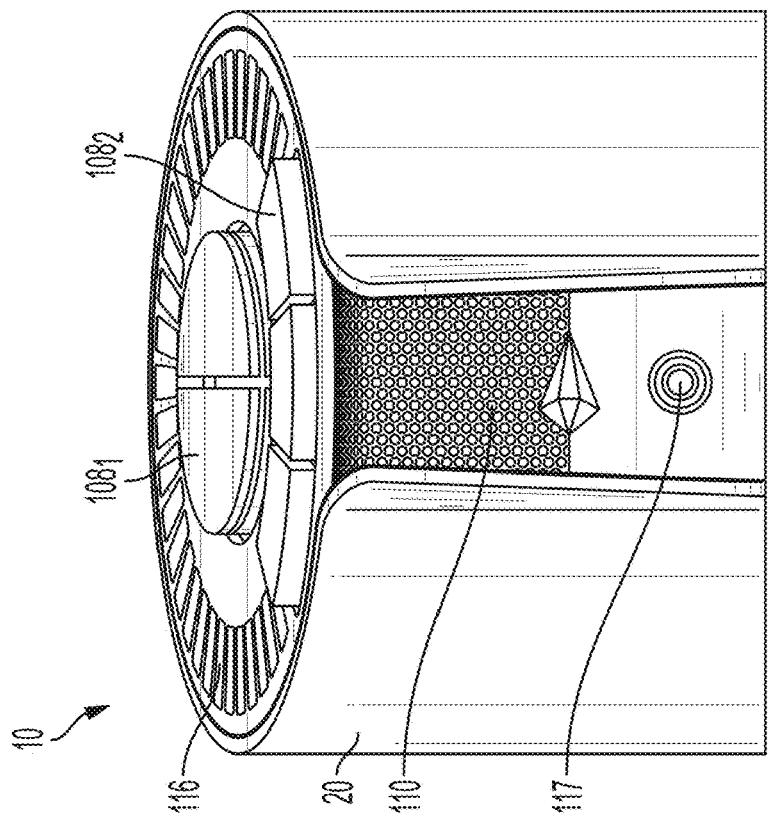
FIG. 1B is a front view of the illustrative audio controller of FIG. 1A, according to some non-limiting embodiments.
Figure 1D:
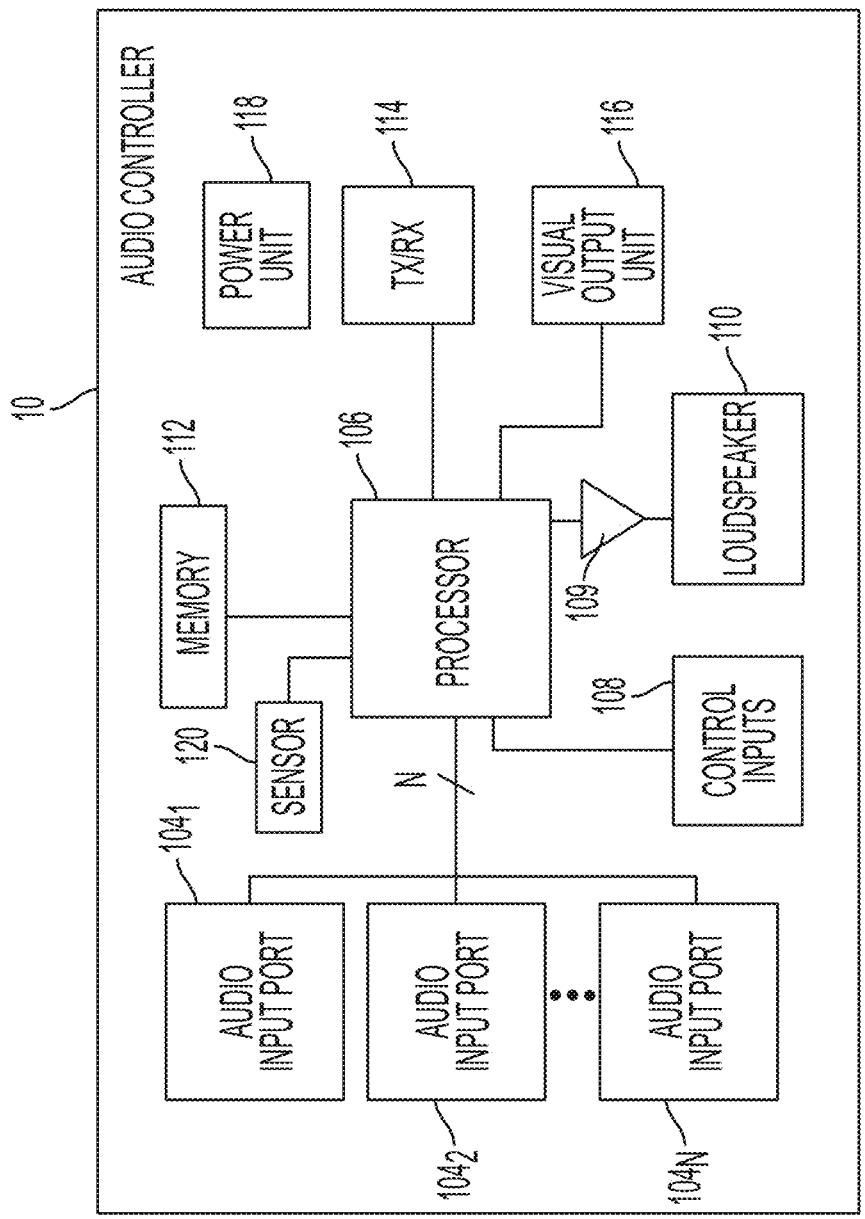
FIG. 1D is a block diagram of a representative audio controller, according to some non-limiting embodiments.

FIG. 1B and FIG. 1C are a front view and a rear view, respectively, of representative audio controller 10. Representative audio controller 10 includes a housing 20, which may be made of any of numerous materials. Housing 20 may store various circuitry for capturing, processing, storing, playing, transmitting and/or receiving audio. Some examples of this circuitry is shown in FIG. 1D, described in further detail below.

In some embodiments, audio controller 10 may have a form factor which promotes portability and/or ease of use. For example, in some embodiments, housing 20 may define (e.g., encompass) a volume between 125 cm³ and 50,000 cm³, between 250 cm³ and 50,000 cm³, between 500 cm³ and 50,000 cm³, between 1,000 cm³ and 50,000 cm³, between 5,000 cm³ and 50,000 cm³, between 10,000 cm³ and 50,000 cm³, between 25,000 cm³ and 50,000 cm³, between 125 cm³ and 20,000 cm³, between 250 cm³ and 20,000 cm³, between 500 cm³ and 20,000 cm³, between 1,000 cm³ and 20,000 cm³, between 5,000 cm³ and 20,000 cm³, between 7,500 cm³ and 20,000 cm³, between 10,000 cm³ and 20,000 cm³, between 12,500 cm³ and 20,000 cm³, between 15,000 cm³ and 20,000 cm³, between 17,500 cm³ and 20,000 cm³, between 125 cm³ and 10,000 cm³, between 250 cm³ and 10,000 cm³, between 500 cm³ and 10,000 cm³, between 1,000 cm³ and 10,000 cm³, between 5,000 cm³ and 10,000 cm³, between 7,500 cm³ and 10,000 cm³, or within any suitable range within such ranges. Of course, an audio production controller is not limited to having a housing in the volume ranges listed above, as a housing may encompass any suitable volume.

Referring to FIG. 1B, representative audio controller 10 includes top buttons 1081 and front buttons 1082, each of which may be configured to trigger a certain operation. Examples of operations that may be triggered using buttons 1081 and/or 1082 include "record," "play," and "stop." In some alternative embodiments, an audio controller may include no buttons at all. Visual output unit 116 provide any of numerous information to a user. For example, visual output unit 116 may light up when a track is being recorded, and convey the gain of the audio input. Representative audio controller 10 also includes loudspeaker 110, for producing audio output, and integrated microphone 117, for receiving audio (e.g., voice) input.

FIG. 1C is a rear view of representative audio controller 10, and depicts audio input ports 104, which may be connected to any of numerous audio sources, such as instruments, external microphones and computing systems. Although representative audio controller 10 includes two audio input ports, any suitable number and type of ports may be provided. In FIG. 1C, vents 105 enable air to pass inside and outside of housing 20, such as to cool the internal circuitry of audio controller 10.

FIG. 1D is a block diagram depicting illustrative components of a representative audio controller 10, in accordance with some embodiments of the invention. In FIG. 1D, these components include a plurality of audio input ports $104_1$, $104_2$ . . . $104_N$, a processor 106, a memory 112, control inputs 108, amplifier 109, loudspeaker 110, transceiver 114, visual output unit 116, power unit 118 and sensor 120. The audio input ports $104_1$, $104_2$ . . . $104_N$ (examples of which include those illustrated in FIG. 1C) may be connected to different audio sources. In some embodiments, the audio controller may be equipped with a microphone (e.g., microphone 117 of FIG. 1B), which may be connected to an audio input port. The audio input ports $104_1$, $104_2$ . . . $104_N$ may receive audio inputs from one or more audio sources, and the audio input(s) may be provided to processor 106. Processor 106 may be implemented using a microprocessor, a microcontroller, an application specific integrated circuit (ASIC), a field programmable gate array (FPGA), or any other suitable type of digital and/or analog circuitry. Processor 106 may be used to sample the audio inputs to digitize them. In addition, processor 106 may be configured to process the audio inputs in any suitable manner (e.g., to filter, equalize, amplify, or attenuate).

Processor 106 may be coupled to memory 112. Memory 112 may have any suitable size, and may be implemented using any suitable type of memory technology, including random access memory (RAM), read only memory (ROM), Flash memory, electrically erasable programmable read only memory (EEPROM), etc. Memory 112 may be configured to store audio inputs received through the audio input ports, and/or to store modified versions of the audio inputs. In some embodiments, a portion of memory 112 may be used to buffer data to be transmitted to electronic devices.

Processor 106 may be coupled to loudspeaker 110. In some embodiments, processor 106 may be coupled to loudspeaker 110 through amplifier 109. Processor 106 may comprise circuitry for driving loudspeaker 110. For example, processor 106 may comprise a digital-to-analog converter. Amplifier 109 may be used to adjust the level of the audio output as desired.

Processor 106 may be coupled to control inputs 108. Control inputs 108 may include any suitable user interface, including physical buttons (examples of which are button 1081 and 1082), touch screen controls, and/or any other suitable control(s). It should be appreciated that control inputs 108 need not be manually actuated. For example, in some embodiments, control inputs 108 may be actuated via voice recognition.

Audio controller 10 may further comprise visual output unit 116. Visual output unit 116 may be configured to provide visual outputs in any suitable way. For example, visual output unit 116 may comprise an array of light emitting elements, such as light emitting diodes (LEDs), a display, such as a liquid crystal display (LCD), and/or any other suitable visual output component(s). In some embodiments, visual output unit 116 may light up in response to actuation of a button of control inputs 108, and/or in response to any other suitable form(s) of input. For example, visual output unit 116 may light up when a track is being recorded, or when the audio controller detects audio above a certain threshold.

Audio controller 10 may further comprise transceiver (TX/RX) 114. Transceiver 114 may be a wireless transceiver in some embodiments, and may be configured to transmit and/or receive data to/from an electronic device, such as smartphone 14, loudspeaker 16 and/or television set 18. Transceiver 114 may be configured to transmit/receive data using any suitable wireless communication protocol, whether now known or later developed, including but not limited to Wi-Fi, Bluetooth, ANT UWB, ZigBee, LTE, GPRS, UMTS, EDGE, HSPA+, WIMAX and Wireless USB. Transceiver 114 may comprise one or more antennas, such as a strip antenna or a patch antenna, and circuitry for modulating and demodulating signals. When used as a transmitter, transceiver 114 may transmit digital representations of audio, so that the audio can be further processed and/or played using the receiving device. When used as a receiver, transceiver 114 may receive digital representation of audio and/or instructions for controlling the operations of audio controller 10.

Sensor 120 may be used to sense any of numerous physical quantities. Information obtained using sensor 120 may be used for example to adaptively adjust the manner in which noise in audio signals is suppressed, as described in detail below with reference to FIG. 8A. In some embodiments, sensor 120 may include an inertial sensor to sense the orientation of audio controller 10. In some embodiments, sensor 120 may include a sensor designed to detect how proximate audio controller 120 is relative to conductive surfaces that may reflect electromagnetic energy.

Audio controller 10 may further comprise a power unit 118. The power unit 118 may power some or all the components of audio controller 10, and may comprise one or more batteries.

It should be appreciated that FIG. 1D is intended to merely illustrate some of the components which a representative audio controller 10 may include. In some embodiments, an audio controller 10 may include additional components not depicted in FIG. 1D. For example, audio controller 10 may include multiple processors 106, any one or more of which may include one or more processing cores. Audio controller 10 may also, or alternatively, include multiple memories 112, multiple transceivers 114 (each of which may be adapted to communicate via any suitable communication protocol(s), whether now known or later developed), and/or an external power input. In some embodiments, audio controller 10 may not include all of the components which are shown in FIG. 1D. Audio controller 10 may include any suitable configuration of components, as the invention is not limited in this respect.

Figure 2:
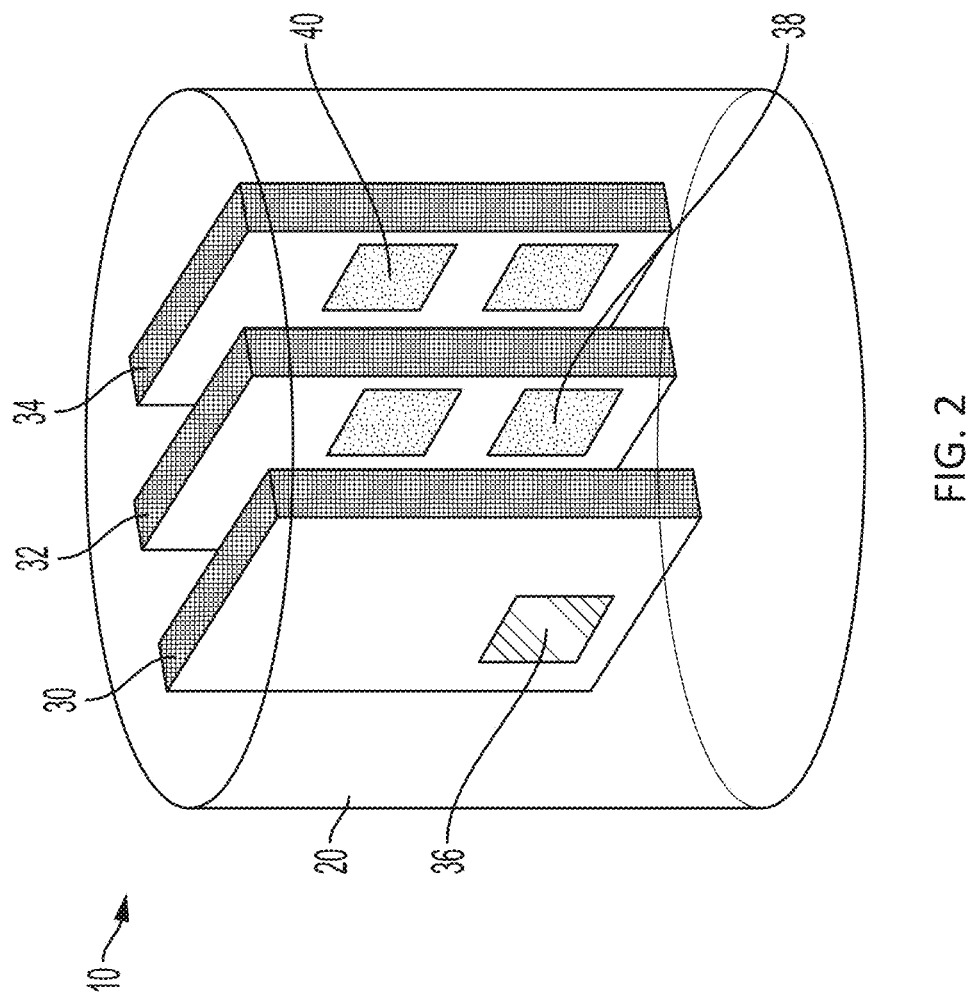
FIG. 2 is a schematic diagram conceptually depicting the interior of an illustrative audio controller comprising various sub-systems, according to some non-limiting embodiments.

FIG. 2 conceptually illustrates the interior of representative audio production controller 10. (The depiction in FIG. 2 of the components of audio production controller 10 should not be considered to scale.) In FIG. 2, audio controller 10 includes printed circuit boards (PCBs) 30, 32 and 34. Each PCB may include one or more sub-systems, examples of which are described above with reference to FIG. 1D. In this illustration, PCB 30 includes transceiver 36, PCB 32 includes audio circuitry 38, and PCB 34 includes electromagnetic source 40. Transceiver 36 may enable audio controller 10 to communicate with electronic devices disposed outside audio controller 10 (e.g., devices 14, 16 and 18 depicted in FIG. 1A).

In some embodiments, transceiver 36 may be adapted to communicate according to a Wi-Fi standard. As such, transceiver 36 may include one or more antennas configured to emit electromagnetic energy at radio frequencies (i.e., RF). Of course, transceiver 36 may be adapted to communicate using any suitable wireless communication protocol(s).

In the illustration shown in FIG. 2, audio circuitry 38 performs operations like capturing audio input, digitizing and/or processing the audio input, causing the digitized audio to be stored in memory, and/or other functions. In the illustration shown in FIG. 2, electromagnetic source 40 may be any suitable electronic circuit which produces electromagnetic energy. The electromagnetic energy produced by electromagnetic source 40 may be radiated and/or conducted between different points of audio controller 10. For example, the electromagnetic energy produced by electromagnetic source 40 may be in the form of electromagnetic waves radiating in space, may be in the form of electric signals (such as electric currents and/or voltages) propagating between different points of audio controller 10 via electrically conductive paths, or may transferred between different points within audio controller 10 in any other suitable fashion. In some embodiments, for example, electromagnetic source 40 may include digital clocking circuitry, power supplies, voltage regulators, cellular data transmission components, inter system digital communication components, drive matrixes, and/or other circuits inadvertently leaking electromagnetic energy. In one specific example, electromagnetic source 40 includes a voltage regulator arranged to operate in a switching mode (such as a buck converter). In this example, electromagnetic source 40 produces electromagnetic energy in the form of electric signals. These electric signals may arise owing to the switching nature of these types of voltage regulators, and therefore may exhibit ripples and/or other time-varying features.

It should be appreciated that although transceiver 36, audio circuitry 38, and electromagnetic source 40 are depicted in FIG. 2 as residing on separate PCBs, in other systems, two or more of these sub-systems may reside on a common PCB. It should be appreciated, moreover, that PCBs are described herein as only one example of a possible substrate on which the sub-systems may reside. Substrates other than PCBs, such as interposers and flexible substrates, may be used, additionally or alternatively.

In FIG. 2, the compact form factor of audio controller 10 means that audio circuitry 38 is in close proximity to transceiver 36 and electromagnetic source 40. For example, audio circuitry 38 may be spaced from each of transceiver 36 and electromagnetic source 40 by less than 40 cm, less than 35 cm, less than 30 cm, less than 25 cm, less than 20 cm, less than 15 cm, less than 10 cm, less than 7.5 cm, less than 5 cm, less than 3 cm, less than 2 cm, or less than 1 cm. The close proximity may result in coupling of electromagnetic energy emitted by transceiver 36 and/or produced by electromagnetic source 40 to audio circuitry 38, which may cause audio signals produced by audio circuitry 38 to include unwanted noise. It should be appreciated that the energy produced by electromagnetic source 40 may couple to audio circuitry 38 in any suitable fashion, including via radiation (e.g., via electromagnetic waves) or conduction (e.g., by means of a ground plane, a trace or other conducive paths).

Although conductive barriers (not shown in FIG. 2) may absorb electromagnetic energy placed between electromagnetic source 40 and audio circuitry 38, and/or between transceiver 36 and audio circuitry 38, electromagnetic coupling may occur even in the presence of these conductive barriers.

The electromagnetic energy from transceiver 36 may be emitted in bursts, so that information is transmitted intermittently, in transient fashion during short periods of time. During a burst transmission, transceiver 36 may produce significant electromagnetic energy, much more than when a burst is not being transmitted. In this respect, the Assignee has recognized that if transceiver 36 communicates according to a Wi-Fi standard (including any of the IEEE 802.11 standards, IEEE 802.22 standards, and/or other Wi-Fi protocol), transmitting via burst is used to enable one transmitting device to send a series of frames in succession without relinquishing control of the entire transmission medium. Examples or bursting techniques include frame bursting and packet bursting, among others.

FIG. 3 conceptually illustrates the effect of unwanted noise on an audio signal. Signal 300 includes noise occurring as a result of burst transmissions, among other noise. In this respect, signal 300 exhibits a noise floor 301 during times when no data is transmitted. The non-zero amplitude of noise floor 301 may be the result of random noise, such as white noise. A particular noise event occurs during a burst transmission, indicated at 302, between $t_1$ and $t_2$. Another noise event occurs during a second burst transmission, indicated at 304, between $t_3$ and $t_4$. When a noise event resulting from a burst transmission occurs, the amplitude of signal 300 is significantly greater, in absolute value, than noise floor 301. In the illustration shown in FIG. 3, noise events 302 and 304 result in signal 300 exhibiting rectangular envelops. However, it should be appreciated that not a noise event resulting from a burst transmission and/or other source of electromagnetic energy may not exhibit an envelop having a rectangular, or any other specific, shape.

Signal 310 includes high-quality audio. In some embodiments, this audio may be characterized by a signal-to-noise ratio of 110 dB or greater. In some embodiments, the audio may be characterized by a signal-to-noise ratio of 100 dB or greater, of 90 dB or greater, of 80 dB or greater, or having some other signal-to-noise ratio. Signal 310 may, in some embodiments, comprise audio produced by the audio circuitry of audio controller 10 in the absence of electromagnetic interference, such as audio which is suitable for recording music and/or sound.

Signal 320 comprises the audio included in signal 310 and the noise included in signal 300. It can be seen in FIG. 3 that signal 320 is substantially equal to audio signal 310 except when the noise events resulting from burst transmissions occur. However, between $t_1$ and $t_2$, audio signal 320 includes a portion 322 which exhibits an envelop having somewhat similar characteristics as the envelop indicated at 302 exhibited by signal 300 during the same time period. Similarly, between $t_3$ and $t_4$, audio signal 320 also includes a portion 324 which exhibits an envelop having somewhat similar characteristics as the envelop indicated at 304 by signal 300 during the same time period. As a result, audio signal 320 deviates significantly from audio signal 310 between $t_1$ and $t_2$ and between $t_3$ and $t_4$. The differences between signal 320 and signal 310 may be unacceptable to a user of audio production controller 10.

Figure 4A:
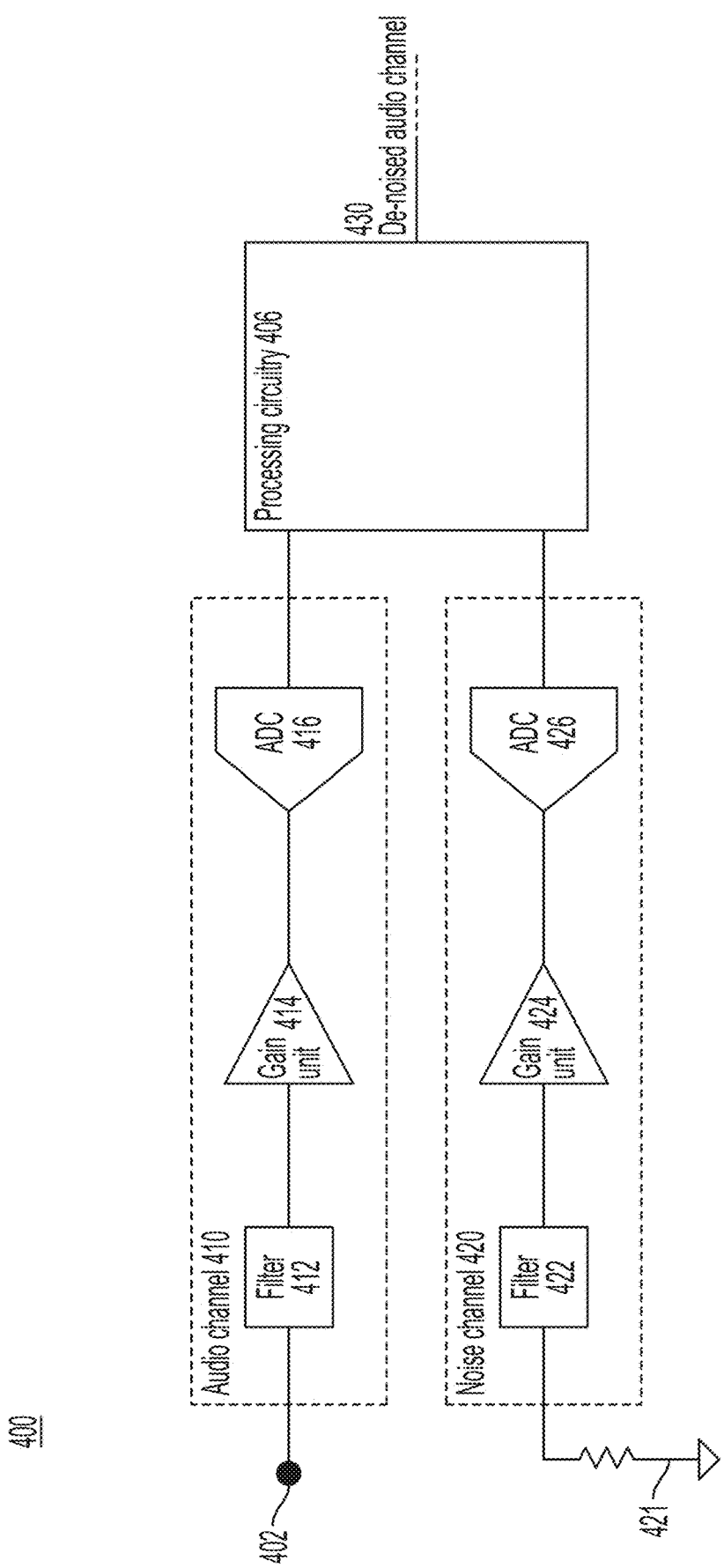
FIG. 4A is a block diagram illustrating a portion of an illustrative audio controller comprising an audio channel, a noise channel and processing circuitry, according to some non-limiting embodiments.

FIG. 4A depicts representative circuitry 400 of an audio production controller for identifying and addressing unwanted noise in an audio signal, in accordance with some embodiments of the invention. The representative circuitry 400 of FIG. 4A comprises two physically separate channels. An audio channel 410 carries an audio signal generated by audio circuitry as well as noise, including noise which results from a source of electromagnetic energy. As such, audio channel 410 can be thought of as carrying a signal like signal 320 shown in FIG. 3. A noise channel 420 carries a signal comprising noise, including noise resulting from a source of electromagnetic energy. As such, audio channel 420 can be thought of as carrying a signal like signal 300 shown in FIG. 3.

In some embodiments, audio channel 410 and noise channel 420 may be situated in close physical proximity within an audio production controller, so that the two channels are subjected to electromagnetic energy having similar characteristics (e.g., similar timing, amplitude, shape, spectral content, phase, power, and/or other characteristics), so it may be assumed that any noise resulting from the electromagnetic energy is included in the signals captured by both channels. For example, in some embodiments, audio channel 410 and noise channel 420 may be less than 10 cm apart, less than 7.5 cm apart, less than 5 cm apart, less than 2.5 cm apart, less than 1 cm apart, less than 7.5 mm apart, less than 5 mm apart, less than 2.5 mm apart, less than 1 mm apart, less than 750 µm apart, less than 500 µm apart, less than 250 µm apart, less than 100 µm apart, less than 75 µm apart, less than 50 µm apart, less than 25 µm apart, or less than less than 10 µm apart. Of course, audio channel 410 and noise channel 420 are not limited to being separated by any of the distances listed above, and may be separated by any suitable distance.

Audio channel 410 includes filter 412, gain unit 414 and analog-to-digital converter (ADC) 416. Noise channel 420 includes filter 422, gain unit 424 and ADC 426. Of course, an audio channel 410 and/or noise channel 420 implemented in accordance with the invention need not include all the components shown in FIG. 4A, and/or may include other components not represented in FIG. 4A.

ADC 416 digitizes signals with a high sampling rate, so as to produce a high-audio quality audio signal. For example, in some embodiments, ADC 416 may sample at a frequency between 16 KHz and 384 KHz, between 24 KHz and 384 KHz, between 48 KHz and 384 KHz, between 128 KHz and 384 KHz, between 192 KHz and 384 KHz, between 256 KHz and 384 KHz, between 16 KHz and 256 KHz, between 24 KHz and 256 KHz, between 48 KHz and 256 KHz, between 128 KHz and 256 KHz, between 192 KHz and 256 KHz, between 16 KHz and 192 KHz, between 24 KHz and 192 KHz, between 48 KHz and 192 KHz, between 128 KHz and 192 KHz, between 12 KHz and 128 KHz, between 24 KHz and 128 KHz, between 48 KHz and 128 KHz, between 12 KHz and 48 KHz, between 24 KHz and 48 KHz, between 36 KHz and 60 KHz, between 40 KHz and 56 KHz, between 42 KHz and 54 KHz, between 44 KHz and 52 KHz, between 46 KHz and 50 KHz, or between any other suitable range(s). In some embodiments, ADC 416 may sample at 48 KHz, 128 KHz, 192 KHz, 256 KHz or 384 KHz.

In some embodiments, ADC 416 and ADC 426 may be designed to have similar characteristics. For example, ADC 416 and ADC 426 may be configured to operate at substantially the same sampling rate, have substantially the same resolution (e.g., number of bits), and/or have substantially the same noise figure. (As used herein, the expression "substantially the same" is used to indicate values that are within 10% of each other.) Of course, the invention is not limited to employing ADCs having similar characteristics, as ADC 416 may or may not share one or more characteristics with ADC 426.

In some embodiments, filter 412 and filter 422 may also have similar characteristics, such as by having substantially the same amplitude response, power response, phase response, frequency response, poles and zeros, input impedance, output impedance, and/or noise figure. However, the invention is not limited to employing filters having similar characteristics, as filter 412 may or may not share one or more characteristics with filter 422. Moreover, in some embodiments, a filter 422 may not be present in noise channel 420.

Gain unit 414 and gain unit 424 may also have similar characteristics, such as substantially the same amplitude gain, power gain, phase response, frequency response, poles and/or zeros, input impedance, output impedance, and/or noise figure. Of course, the invention is not limited to employing gain units having similar characteristics, as gain unit 414 may or may not share one or more characteristics with gain unit 424.

In some embodiments, configuring audio channel 410 and noise channel 420 so that corresponding components have similar characteristics may provide benefits in that it may be assumed that any differences in the signals in audio channel 410 and noise channel 420 result from the presence of audio content in audio channel 410, and absence thereof in noise channel 420.

In addition to audio channel 410 and noise channel 420, representative circuitry 400 comprises audio input port 402, noise channel termination 421, and processing circuitry 406. Audio input port 402 receives an audio input produced by an audio source and provides it to audio channel 410. Audio input port 402 may, for example, comprise one of the audio input ports 104 shown in FIG. 1D. Termination 421 terminates noise channel 420 to ground, or to any suitable reference terminal electrically isolated from audio input port 402, so that noise channel 420 does not receive the audio signal generated by audio channel 410. Termination 421 may, for example, comprise one or more resistors, diodes, and/or non-linear components. Although not shown in FIG. 4A, in some embodiments, termination 421 may be replaced by active circuitry to enhance noise pickup. In this respect, although depicted in FIG. 4A as a termination, component 421 may be connected in series with another component (e.g., one which is depicted in FIG. 4A), or via any other suitable configuration(s).

Processing circuitry 406 is configured to produce a de-noised audio signal based upon the signals in audio channel 410 and noise channel 420, as described in greater detail below. Processing circuitry 406 may, for example, be implemented via the processor 106 of FIG. 1D.

In some embodiments, means for limiting audio channel 410's exposure to noise arising from electromagnetic energy may be employed. For example, a conductive shield may be positioned adjacent to audio channel 410 to attenuate electromagnetic energy that may otherwise reach audio channel 410. Alternatively or additionally, some embodiments may employ means for promoting the exposure of noise channel 420 to noise arising from electromagnetic energy. For example, noise channel 420 may include one or more diodes arranged to demodulate radio frequency (RF) electromagnetic energy into the audible portion of the spectrum.

Figure 4B:
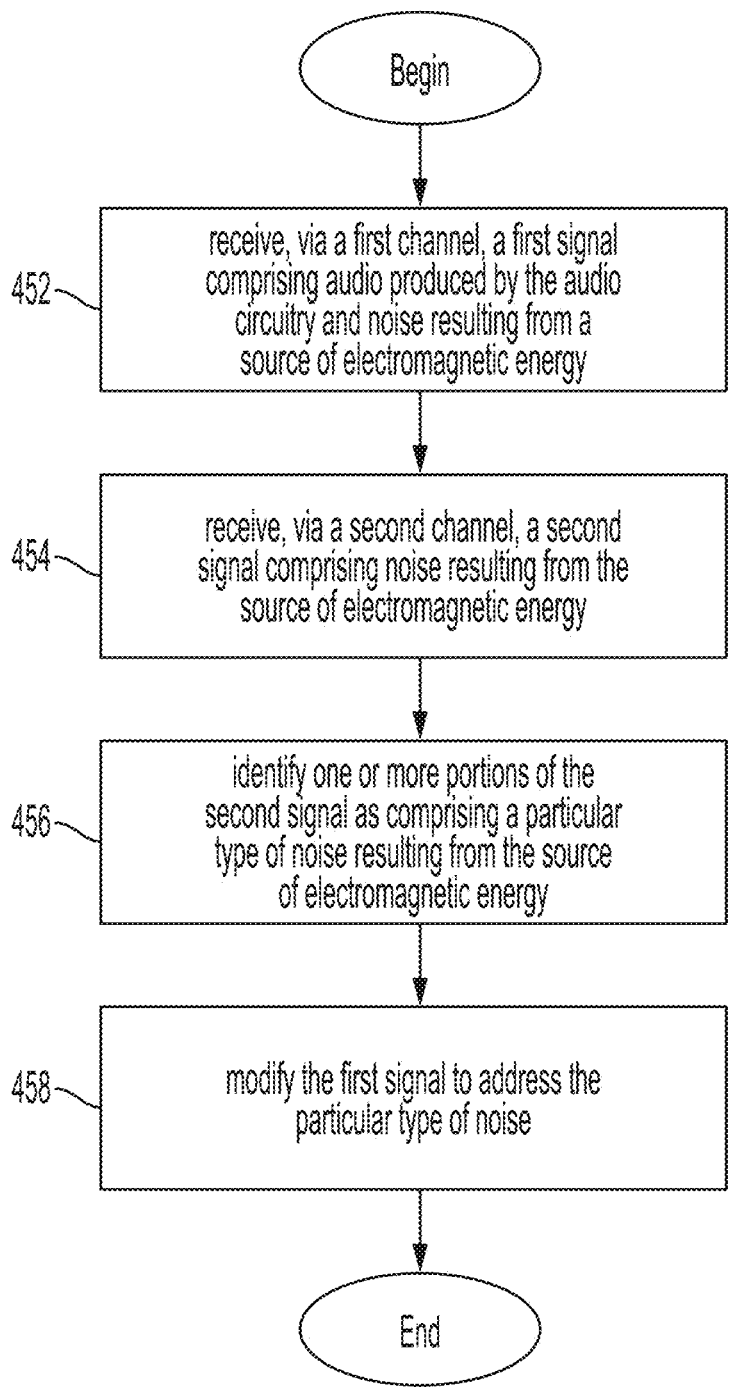
FIG. 4B is a flowchart depicting a representative process for identifying and addressing unwanted noise in an audio signal, according to some non-limiting embodiments.

FIG. 4B depicts a representative process 450 for identifying and addressing unwanted noise in an audio signal. Although representative process 450 is described below using the circuitry shown in FIG. 4A, it should be appreciated that representative process 450 may be performed using any suitable components, which may or may not include various components shown in FIG. 4A.

Representative process 450 begins at act 452, wherein a first signal is received via a first channel, the first signal comprising audio produced by audio circuitry and noise resulting from a source of electromagnetic energy. One example of a source of electromagnetic energy is transceiver 36 shown in FIG. 2. Another example of a source of electromagnetic energy is circuitry 40 shown in FIG. 2. As noted above, the noise included in the first signal may, for example, be the result of electromagnetic coupling between the first channel and the source of electromagnetic energy. One example of the first channel is audio channel 410 shown in FIG. 4A, and one example of the first signal is signal 320 shown in FIG. 3.

Representative process 450 then proceeds to act 454, wherein a second signal is received via a second channel, the second signal comprising noise which includes but is not limited to the noise resulting from the source of electromagnetic energy. In some embodiments, the first channel and second channels may be in sufficiently close proximity that both channels are subject to electromagnetic energy having similar characteristics. One example of the second channel is noise channel 420 shown in FIG. 4A, and one example of the second signal is signal 300 shown in FIG. 3.

Representative process 450 then proceeds to act 456, wherein one or more portions of the second signal are identified as comprising noise resulting from the source of electromagnetic energy. Act 456 may be performed using processing circuitry 406, shown in FIG. 4A. Act 456 may include identifying the portion(s) of the second signal based on the portion(s) comprising noise having any of numerous characteristics. For example, act 456 may involve identifying one or more portions comprising noise exhibiting specific timing characteristics, spectral characteristics, shape characteristics, pattern characteristics, power characteristics, phase characteristics, envelop characteristics, and/or any other suitable characteristics. In an illustrative embodiment which is described below, act 456 involves identifying one or more portions of the second signal as comprising noise which results from burst transmissions. However, it should be appreciated that the invention is not limited to identifying only one or more portions which comprise noise resulting from burst transmissions, and that one or more portions comprising noise resulting from any suitable phenomenon may be identified.

The identification of one or more portions comprising noise resulting from burst transmissions may be performed in any of numerous ways. For example, in some embodiments, act 456 may involve identifying one or more portions of the second signal as comprising pulses, such as one or more portions having an absolute value which meet or exceed an amplitude threshold, and/or share certain similarities with a reference waveform.

FIG. 5A depicts a representative implementation of the processing circuitry 406 shown in FIG. 4A. The implementation shown in FIG. 5A may be used to identify one or more portions of the second signal as comprising noise resulting from burst transmissions. In this representative implementation, processing circuitry 406 includes burst detector 502, time unit 512, filter 514, and adder 516, each of which may be implemented using hardware and/or software. At a high level, burst detector 502 receives the signal from noise channel 420 and identifies any portion(s) of the signal as exhibiting characteristics typical of noise resulting from burst transmissions, and provides a signal output Si to time unit 512 indicating any time interval(s) during which the one or more identified portions are present. Time unit 512 provides a signal to filter unit 514 so that the noise included in the identified portion(s) may be addressed.

Figure 5B:
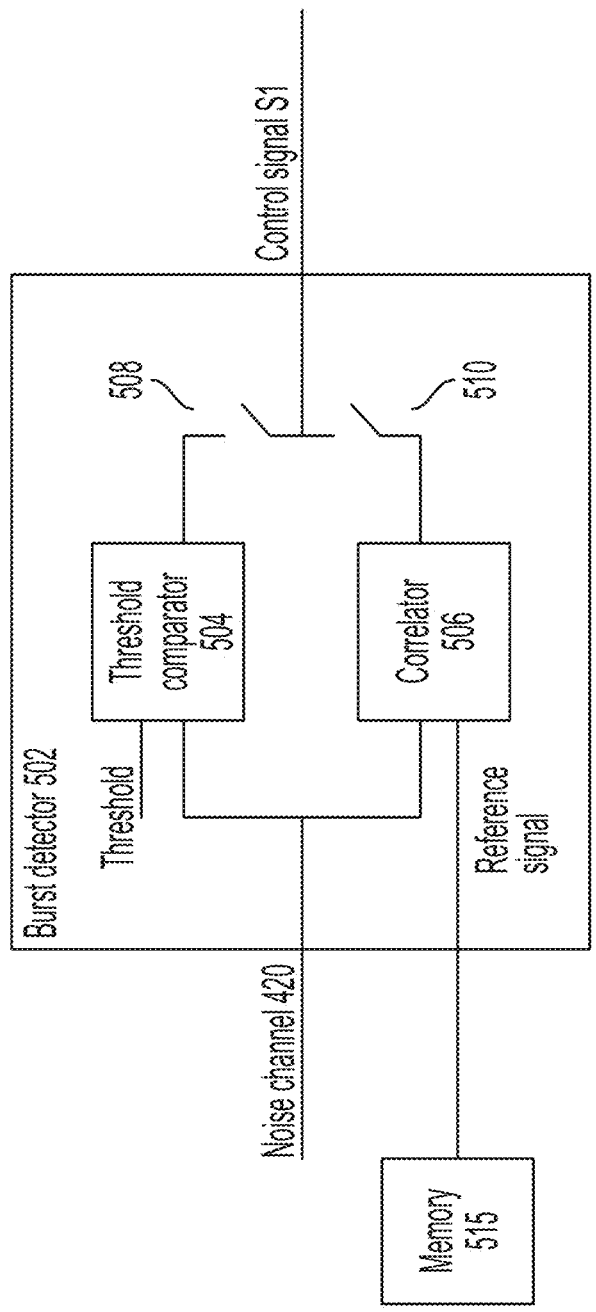
FIG. 5B is a block diagram depicting an example of a burst detector that may be used with the processing circuitry of FIG. 5A, according to some non-limiting embodiments.

A representative implementation of burst detector 520 is shown in more detail in FIG. 5B. In FIG. 5B, burst detector 502 includes threshold comparator 504 and correlator 506 for identifying the one or more portions of the second signal which comprise noise resulting from burst transmissions. The switches 508 and 510 shown in FIG. 5B indicate that comparator 504 and correlator 506 may be used together, or individually, in determining whether one or more portions of the second signal include noise resulting from burst transmissions. That is, if switches 508 and 510 are both placed in an on-state, then comparator 504 and correlator 506 may be used together in analyzing the second signal. However, if only one of switches 508 and 510 is placed in an on-state, then only the block corresponding to the switch placed in the on-state may be used in analyzing the second signal.

Figure 6:
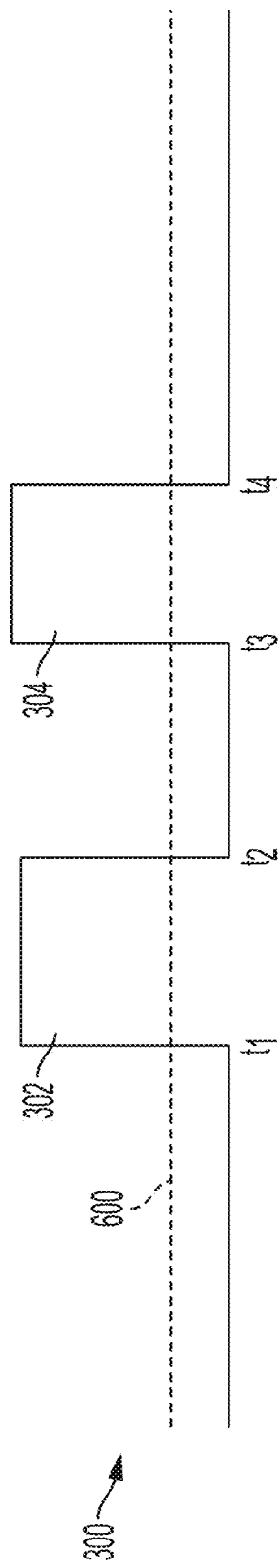
FIG. 6 is a plot of a representative noise signal and threshold, according to some non-limiting embodiments.

FIG. 6 provides a conceptual depiction of how threshold comparator 504 may be used in analyzing the second signal to identify one or more portions of the second signal as including noise resulting from burst transmissions. In the example shown in FIG. 6, threshold comparator compares the amplitude of the second signal to an amplitude threshold 600. Amplitude threshold 600 may have any suitable value. In some embodiments, amplitude threshold 600 may have a value between zero and a maximum expected amplitude of noise occurring during a burst transmission. In some embodiments, if the absolute value of the amplitude of one or more portions of the second signal exceed the amplitude threshold, then threshold comparator 504 determines that the portion(s) include noise resulting from burst transmissions.

Figure 7:
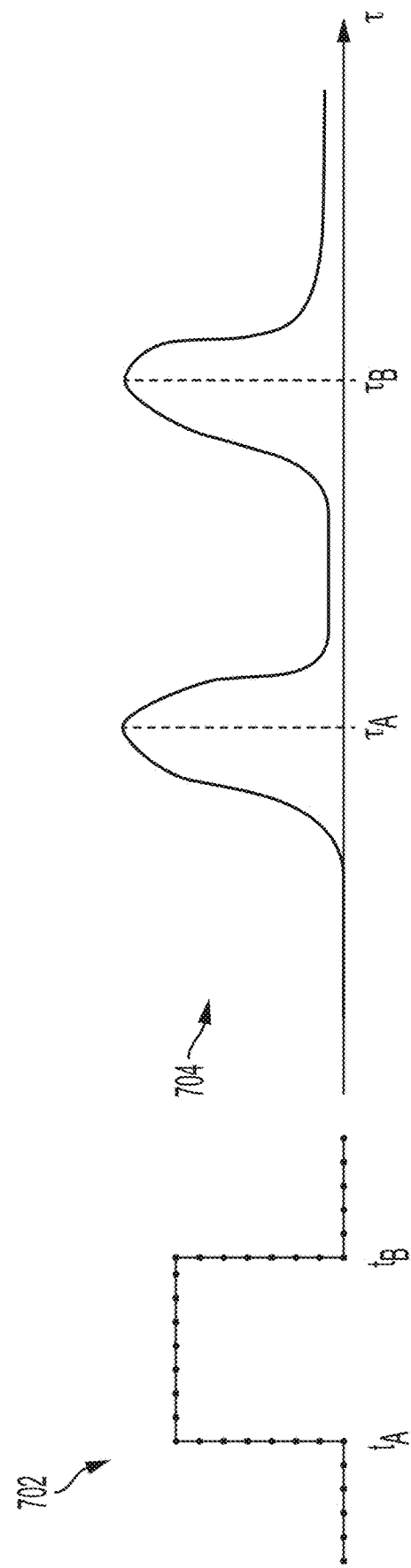
FIG. 7A is a plot of a representative reference waveform which may indicate the presence of a type of noise in an audio signal, according to some non-limiting embodiments.
FIG. 7B is plot of a representative signal resulting from correlation of the noise signal of FIG. 3 with the reference waveform of FIG. 7A, according to some non-limiting embodiments.

FIGS. 7A and 7B depict how correlator 506 may analyze the second signal to identify one or more portions of the second signal as including noise resulting from burst transmissions. In some embodiments, correlator 506 may identify one or more portions of the second signal as including noise resulting from burst transmissions by comparing the portion(s) to a reference waveform portion. A reference waveform portion may, in some embodiments, comprise one or more characteristics typical of noise occurring during burst transmissions. For example, a reference waveform portion may have a shape which typical of noise occurring during a burst transmission. An example reference waveform portion 702 is shown in FIG. 7A. It can be seen in FIG. 7A that reference waveform 702 is generally rectangular in shape, exhibits a particular amplitude, and has a duration between $t_A$ and $t_B$, which may be typical of noise which occurs during a burst transmission. Correlator 506 may retrieve reference waveform portion 702 from memory 515 (FIG. 5B) for a comparison with portions of the second signal.

In some embodiments, to determine whether the second signal includes noise resulting from a burst transmission, correlator 506 may perform cross-correlation using the reference waveform portion. An illustrative result of such a cross-correlation is shown in FIG. 7B, in which cross-correlation function 704 indicates time delays $\tau$ at which the second signal correlates to reference waveform portion 702. It can be seen in FIG. 7B that the peak amplitude of function 704 at delay $\tau_A$ indicates a high degree of similarity between the second signal and the reference waveform portion at delay $\tau_A$, and that the peak amplitude of function 704 at delay $\tau_B$ indicates a high degree of similarity between the second signal and the reference waveform portion at this delay $\tau_B$. In some embodiments, correlator 506 may employ the result of cross-correlation in identifying one or more portions which include noise resulting from a burst transmission. For example, correlator 506 may identify one or more portions of the second signal correlating to a delay at which the amplitude of a cross-correlation function exceed a predetermined amplitude threshold as including noise resulting from a burst transmission.

Referring again to FIG. 5A, upon identifying one or more portions of the second signal as including noise resulting from burst transmissions, burst detector 502 provides a control signal Si to time unit 512 comprising the second signal and the time interval(s) during which the identified portion(s) occur(s). Using the signals shown in FIG. 3 to illustrate, burst detector 502 may include in control signal Si the second signal, and an indication that the identified portions occur between $t_1$ and $t_2$ and between $t_3$ and $t_4$. Time unit 512 may then, in some embodiments, discard any components of the signal not included in the identified portions.

At the completion of act 456, representative process proceeds to act 458. In the act 458, the first signal received in the act 452 is modified to address the particular type of noise exhibited in the portion(s) identified in the act 456. The first signal may be modified to address this noise in any suitable way. For example, in some embodiments, modification of the first signal may be aimed at suppressing or attenuating the particular type of noise.

In some embodiments, filter 514 (FIG. 5A) may be used in modifying the first signal. Although labeled a "filter" herein for simplicity, filter 514 may comprise any suitable transfer function(s). Filter unit 514 may receive from time unit 512 the one or more portions identified as including noise resulting from burst transmissions and the time intervals during which the one or more portions occur, and process the first signal (via audio channel 410 in FIG. 5A) to address noise resulting from burst transmissions. This may be performed in any of numerous ways. For example, filter 514 may phase shift the noise included in the identified portions (e.g., by shifting phase between 160 degrees and 200 degrees, between 170 degrees and 190 degrees, and/or between any suitable shift interval), and add the phase shifted noise to the first signal at the time intervals corresponding to the time intervals of the identified portions of the second signal.

In some embodiments, filter unit 514 may be configured to produce a dynamic response in modifying the first signal. In this respect, the Assignee has appreciated that one reason for dynamically varying the response of filter unit 514 is that the physical environment in which the audio production controller resides may vary over time, and as a result, the audio channel 410 and noise channel 420 (FIG. 4A) may be subject to varying electromagnetic energy. This may, for example, result in variances between the electromagnetic energy subjected to the first channel and the electromagnetic energy subjected to the second channel. For example, differences in the orientation of the audio production controller, the proximity to surfaces which reflect electromagnetic energy, and/or other environmental conditions may result in the audio and noise channels being subject to varying (e.g., different) electromagnetic energy. As a result, in some embodiments, the response of filter unit 514 may be adjusted based upon a comparison between the first signal captured in the audio signal 410 and the second signal captured in the noise channel 420.

It can be seen in FIG. 3 from signals 320 (i.e., which is captured by audio channel 410) and 300 (i.e., which is captured by noise channel 420) that audio channel 410 and noise channel 420 are subjected to varying electromagnetic energy over time. For example, it can be seen in FIG. 3 that portion 322 of signal 320 exhibits a rectangular shape which is similar in many respects to the rectangular shape exhibited by portion 302 of signal 300. It can also be seen that portion 324 exhibits a shape which is less similar to the rectangular shape exhibited by portion 304 of signal 300. This may be the case, for example, because audio channel 410 and noise channel 420 were subjected to electromagnetic energy which was similar in many respects in the time interval between $t_1$ and $t_2$, but were subjected to electromagnetic energy which is less similar in the time interval between $t_3$ and $t_4$, perhaps due to changing environmental conditions between the time interval between $t_1$ and $t_2$ and the time interval between $t_3$ and $t_4$. As a result, if filter unit 514 applied the same response in modifying the first signal during both time intervals, the result may be undesirable.

As such, in some embodiments, the response applied by filter unit 514 in modifying the first signal may vary based upon the extent to which first signal 320 and second signal 300 are similar during the time interval(s) corresponding to the portion(s) identified in the act 456. For example, in some embodiments, the gain of filter unit 514 may be dynamically varied based upon this similarity. The degree of similarity between the two signals may be determined in any suitable way, such as by cross-correlating signal 320 and signal 300.

Figure 8:
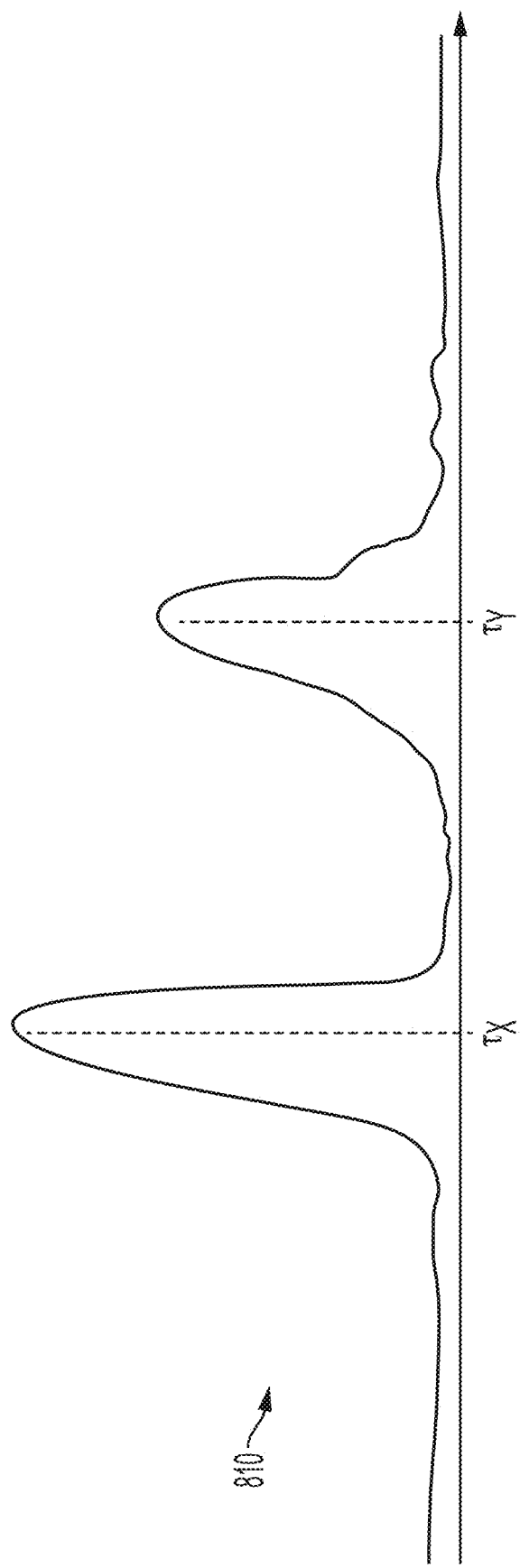
FIG. 8 is plot of a representative signal resulting from correlation of the noise signal of FIG. 3 with the noisy audio signal of FIG. 3, according to some non-limiting embodiments.

An illustrative result of cross-correlating signal 320 and signal 300 is shown in FIG. 8, in which cross-correlation function 810 exhibits two peaks, one at $\tau_x$ and another at $\tau_y$. The peak occurring at $\tau_x$ results from the cross-correlation of portion 322 of signal 320 with portion 302 of signal 300. The peak occurring at $\tau_y$ results from the cross-correlation of portion 324 of signal 320 with portion 304 of signal 300. It can be seen in FIG. 8 that the amplitude of cross-correlation function 810 occurring at delay $\tau_x$ is greater than the amplitude occurring at delay $\tau_x$, indicating that the electromagnetic energy subjected to audio channel 410 and to noise channel 420 was closer to equal at delay $\tau_x$ than at delay $\tau_y$. As a result, the response of filter unit 514 may be adjusted to account for these differences.

This may be performed in any of numerous ways. In one example, filter unit 514 may modify signal 300 such as to replicate aspects of signal 320 during the identified portion(s), so that any phase shifting performed on the identified portion(s) of signal 320 may appropriately compensate for noise included in signal 320. In another example, the gain applied by filter unit 514 may be varied based upon the degree of similarity between the identified portion(s) of signal 320 and signal 300. For example, the gain applied by filter unit 514 may be increased at delay $\tau_x$ to account for audio channel 410 and noise channel 420 being subject to similar electromagnetic energy at this delay, and decreased the gain at delay $\tau_y$ to account for audio channel 410 and noise channel 420 being subjected to different electromagnetic energy at this delay. In yet another example, the gain of filter unit 514 may be varied in a manner corresponding to the amplitude of signal 300 or signal 320, so that appropriate phase shifting to signal 320 may be performed. Any of numerous techniques may be used to alter the response of filter unit 514.

Of course, the invention is not limited to comparing signals 320 and 300 so as to detect varying environmental conditions, so that the response of filter unit 514 in modifying signal 320 may be altered. For example, in some embodiments, sensor 120 shown in FIG. 1D may be used to detect varying environmental conditions. As one example, sensor 120 may comprise an accelerometer to detect movement of audio controller 10, which may initiate a check for changes to environmental conditions. As another example, sensor 120 may comprise a component for directly measuring changes to electromagnetic energy which may affect audio channel 410 and/or noise channel 420. Any of numerous ways of detecting varying electromagnetic energy may be used.

At the completion of act 458, representative process 450 completes.

It should be appreciated that any of numerous variations on representative process 450 may be employed in identifying and addressing unwanted noise in an audio signal. For example, in some variations, the acts described above may be performed in an order different than that which is described above. Other variations may involve different (e.g., more or less) acts than those which are described above. Some variations may involve performing some acts simultaneously, even though the acts are described above as being performed sequentially. It should also be appreciated that some embodiments may employ one of these variations at one time and/or under one set of circumstances, and then switch to using another variation at another time and/or under a different set of circumstances. The invention is not limited to any particular mode of implementation.

It should further be appreciated that the invention is not limited to identifying and addressing unwanted noise in an audio signal produced by an audio production controller, or to a device designed to produce high quality audio (e.g., audio characterized by a signal to noise ratio of 110 dB or greater, of 100 dB or greater, of 90 dB or greater, of 80 dB or greater, and/or having any other suitable characteristics(s)). The invention may be used with any device, whether or not designed to produce audio in any particular quality.

Additionally, it should be appreciated that the invention is not limited to identifying and addressing unwanted noise via the use of multiple channels (e.g., a first channel capturing a signal including audio and noise, and a second channel capturing a signal including noise). As one example, some embodiments may employ a purely algorithmic approach to identifying particular types of unwanted noise in an audio signal, and addressing these types of noise.

Further, it should be appreciated that the invention is not limited to identifying and addressing unwanted noise which results from the operation of wireless transmission components. The invention may be used in identifying and addressing unwanted noise arising from any suitable physical phenomenon, including but not limited to noise resulting from a source of electromagnetic energy.

It should be apparent from the foregoing that some embodiments of the invention are directed to an audio processing device. The audio processing device may comprise a housing, an audio input port attached to the housing, audio circuitry disposed inside the housing and electrically coupled to the audio input port, a source of electromagnetic energy inside the housing, and processing circuitry disposed inside the housing. The processing circuitry is configured to: (A) receive a first signal comprising audio produced by the audio circuitry and noise; (B) receive a second signal comprising the noise; (C) identify one or more portions of the second signal as comprising a particular type of the noise resulting from the source of electromagnetic energy; and (D) modify the first signal to address the particular type of noise. In this respect, it should be appreciated that "the noise" comprised in the first and second signals need not be identical in all respects, and instead may share only certain characteristics or be related in some way, so as to be considered as present in both the first and second signals. For example, the noise in the second signal may exhibit a different amplitude, spectral quality, and/or power at a specific time than the noise in the first signal, but be considered herein as the same noise as is present in the first signal because the noise in both signals share characteristics such as (but not limited to) timing characteristics (e.g., rising edges which occur at substantially the same times, falling edges which occur at substantially the same times, etc.), pattern characteristics (e.g., having pulses occurring at substantially the same times, having substantially the same durations, having substantially the same duty cycles, etc.), and/or any of numerous other characteristics.

It should also be appreciated that a "source of electromagnetic energy" need not comprise a component which generates, emits or radiates electromagnetic energy, such as a wireless transmission component. For example, as described above, a component which conducts energy and thereby causes electromagnetic coupling between the component and the first channel and/or second channel described above may be considered a "source of electromagnetic energy" as used herein even though the component may not have produced the electromagnetic energy. Some non-limiting examples of sources of electromagnetic energy include transceiver 36 and electromagnetic source 40, described above with reference to FIG. 2. However, it should also be appreciated that a source of electromagnetic energy need not be a component of an audio processing device, and may be an item which resides outside the audio processing device and produces or conducts electromagnetic energy.

Figure 9:
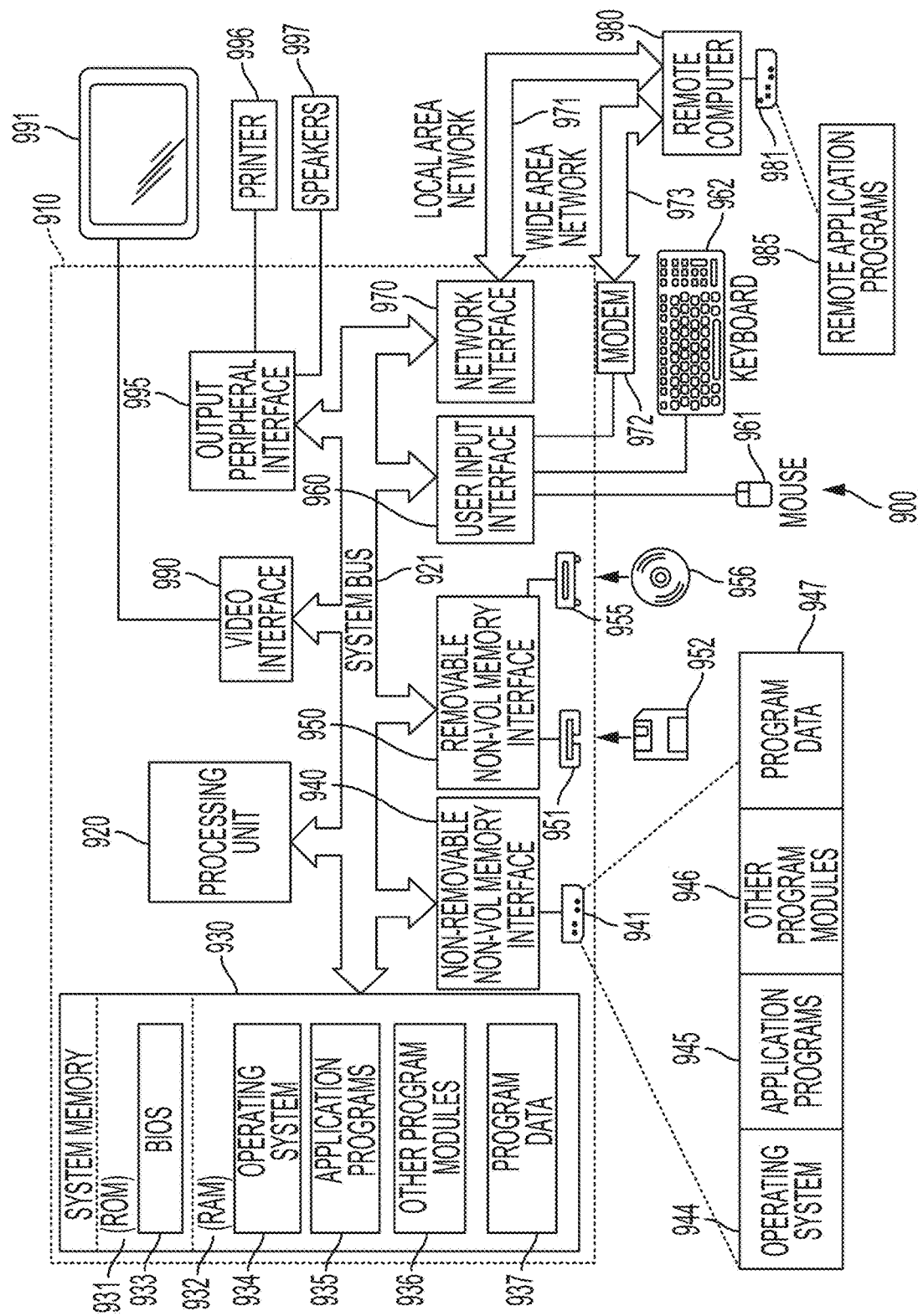
FIG. 9 is a block diagram depicting a representative computer system which may be used to implement various aspects of embodiments of the invention.

It should further be appreciated from the foregoing that some aspects of the invention may employ one or more components of a computing system. FIG. 9 depicts a representative computing system 900, in the form of a computer 910, some components of which may be used to implement certain aspects of the invention. For example, one or more components of computer 910 may constitute the audio production controller, audio sources, and/or devices described above.

In computer 910, components include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 910. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 939, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 959 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 949, and program data 947. Note that these components can either be the same as or different from operating system 934, application programs 935, other program modules 539, and program data 937. Operating system 944, application programs 945, other program modules 949, and program data 947 are given different numbers here to illustrate that, at a minimum, they are different copies. A user may enter commands and information into the computer 910 through input devices such as a keyboard 992 and pointing device 991, commonly referred to as a mouse, trackball or touch pad. Other input devices (not shown) may include a microphone, joystick, game pad, satellite dish, scanner, or the like. These and other input devices are often connected to the processing unit 920 through a user input interface 590 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 999, which may be connected through a output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 990, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Embodiments of the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium. Examples of computer readable media which are not computer readable storage media include transitory media, like propagating signals.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing, and it is, therefore, not limited in its application to the details and arrangement of components set forth in the foregoing description or illustrated in the drawings. For example, aspects described in one embodiment may be combined in any manner with aspects described in other embodiments.

The invention may be embodied as a method, of which various examples have been described. The acts performed as part of the method may be ordered in any suitable way. Accordingly, embodiments may be constructed in which acts are performed in an order different than illustrated, which may include different (e.g., more or less) acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. An audio processing device comprising:
a housing;
an audio input port attached to the housing;
audio circuitry disposed inside the housing and electrically coupled to the audio input port;
a source of electromagnetic energy inside the housing; and
processing circuitry disposed inside the housing and configured to:
receive a first signal comprising audio produced by the audio circuitry and noise;
receive a second signal comprising the noise;
identify a portion of the second signal as comprising a particular type of the noise resulting from the source of electromagnetic energy;
compare the identified portion of the second signal and a corresponding portion of the first signal; and
modify the first signal to address the particular type of noise, the modifying being based at least in part upon a result of the comparing.

2. The audio processing device of claim 1, wherein the processing circuitry is configured to receive the first signal via a first channel, and to receive the second signal via a second channel, the second channel being physically discrete from the first channel.

3. The audio processing device of claim 2, wherein the first channel and the second channel receive electromagnetic energy produced by the source of electromagnetic energy.

4. The audio processing device of claim 3, wherein the processing circuitry is configured to identify the portion of the second signal as comprising a particular type of noise resulting from electromagnetic coupling between the source of electromagnetic energy and the second channel.

5. The audio processing device of claim 1, wherein the processing circuitry is configured to identify the portion of the second signal as comprising a particular type of noise resulting from bursts of electromagnetic energy produced by the source of electromagnetic energy.

6. The audio processing device of claim 1, wherein the processing circuitry is configured to identify the portion of the second signal as comprising the particular type of noise based at least in part upon a comparison between an amplitude associated with the portion and an amplitude threshold.

7. The audio processing device of claim 1, wherein the processing circuitry is configured to identify the portion of the second signal as comprising the particular type of noise based at least in part upon a comparison between a waveform associated with the portion and a reference waveform portion.

8. The audio processing device of claim 1, where the processing circuitry is configured to modify the first signal by determining a first time interval associated with an identified portion of the second signal, and modifying a portion of the first signal at a time interval which overlaps with the first time interval.

9. The audio processing device of claim 1, wherein the source of electromagnetic energy comprises a wireless transmission component.

10. The audio processing device of claim 9, wherein the source of electromagnetic energy comprises an antenna adapted to communicate via a Wi-Fi protocol.

11. The audio processing device of claim 10, wherein the processing circuitry is configured to cause the Wi-Fi antenna to transmit the modified first signal to a device other than the audio processing device.

12. The audio processing device of claim 1, wherein the housing defines a volume that is less than 20,000 cm$^3$.

13. A method for identifying and addressing noise in an audio signal, the method comprising acts of:
(A) receiving a first signal, the first signal comprising audio produced by audio circuitry and noise;
(B) receiving a second signal comprising noise;
(C) identifying a portion of the second signal as comprising a particular type of noise resulting from a source of electromagnetic energy;
(D) comparing the identified portion of the second signal and a corresponding portion of the first signal; and
(E) modifying the first signal to address the particular type of noise in a manner that is determined based at least in part upon a result of the comparing in the act (D).

14. The method of claim 13, wherein the act (A) comprises receiving the first signal via a first channel, and the act (B) comprises receiving the second signal via a second channel, the second channel being physically discrete from the first channel.

15. The method of claim 13, wherein the act (C) comprises identifying the portion of the second signal as comprising a particular type of noise resulting from electromagnetic coupling between the source of electromagnetic energy and the second channel.

16. The method of claim 13, wherein the act (C) comprises identifying the portion of the second signal as comprising a particular type of noise resulting from bursts of electromagnetic energy produced by the source of electromagnetic energy.

17. The method of claim 13, wherein the act (C) comprises identifying the portion of the second signal as comprising the particular type of noise based at least in part upon a comparison between an amplitude associated with each of the one or more portions and an amplitude threshold.

18. The method of claim 13, wherein the act (C) comprises identifying the portion of the second signal as comprising the particular type of noise based at least in part upon a comparison between a waveform associated with each of the portion and a reference waveform portion.

19. The method of claim 13, wherein the act (C) comprises identifying the portion of the second signal as comprising a particular type of noise resulting from operation of a wireless transmission component.

20. A method for use in relation to an audio device, the method comprising acts of:
(A) receiving an audio signal produced by the audio device;
(B) identifying a plurality of portions of the audio signal as each comprising noise resulting from operation of a wireless transmission component by the audio device, the plurality of portions comprising a first portion and a second portion;
(C) determining that a changed environmental condition of the audio device caused the first portion to exhibit a first characteristic that is different than a second characteristic exhibited by the second portion; and
(D) modifying the first portion of the audio signal in a first way so as to address the first characteristic and the second portion of the audio signal in a second way, different than the first way, so as to address the second characteristic.

* * * * *

UNITED STATES PATENT AND TRADEMARK OFFICE
CERTIFICATE OF CORRECTION

PATENT NO. : 11,017,795 B2
APPLICATION NO. : 16/809313
DATED : May 25, 2021
INVENTOR(S) : Todd Baker et al.

Page 1 of 1

It is certified that error appears in the above-identified patent and that said Letters Patent is hereby corrected as shown below:

In the Claims

Column 22, Claim 18, Lines 4-5, "a comparison between a waveform associated with each of the portion and a reference waveform portion" should read --a comparison between a waveform associated with the portion and a reference waveform portion--.

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*